UNITED STATES PATENT OFFICE.

WILLIAM McNEIL, OF CHICAGO, ILLINOIS.

PROCESS OF WATERPROOFING FABRICS.

SPECIFICATION forming part of Letters Patent No. 272,569, dated February 20, 1883.

Application filed May 11, 1882. (No specimens.)

*To all whom it may concern:*

Be it known that I, WILLIAM MCNEIL, of Chicago, in the county of Cook and State of Illinois, have invented a new and useful Process of Waterproofing Fabrics, of which the following is a full, clear, and exact description, which will enable others skilled in the art to which it appertains to prepare and use the same.

The object of my invention is to produce a water-proof fabric which will be more impervious to water and more durable than those water-proof fabrics now in use.

Heretofore gossamer water-proof goods have been made by treating the fabrics in a solution of rubber and naphtha, which only renders them impervious to water for a short while, after the expiration of which the rubber gets decayed and leaky. By my process not only are the fabrics treated rendered perfectly impervious to water, but when ultimately they do become worn or leaky they can be re-dressed or renovated with fresh coatings of my composition until they are as good as new.

When carrying into effect my improved process I first apply to silk, muslin, drilling, cotton, or any suitable fabric a coating of a composition consisting of linseed-oil, litharge, red lead, turpentine, and lamp-black, and apply the same with a large brush, after which the fabric is stretched on a suitable frame and dried. This composition is made by taking a quantity of linseed-oil and boiling it until the fatty nature has disappeared. Then to every gallon of oil add one-half pound of litharge and red lead in equal proportions, and boil again until the mixture has changed to an elastic substance. When this elastic substance has become cold I reduce or thin it by adding one pint of turpentine to the gallon, and then add sufficient lamp-black to make the composition thick. After the first coating of the above composition has dried I rub it thoroughly with pumice-stone and water until a smooth surface is obtained, and when the goods are dry again rub it with dry pumice-stone to remove any grit that may still adhere to the cloth. Another coating of the above composition is then given the material; but the elastic substance, consisting of linseed-oil, litharge, and red lead, is further reduced by an additional one-fourth pint of turpentine to the gallon and a proportionate amount of lamp-black. This second coating of the composition on the cloth is treated substantially in the same way in every respect as the first, excepting only the rubbing of the material with the dry pumice-stone. Another and third coating of the composition is then applied to the material, having the same ingredients and same proportion of ingredients as the composition used for the second coating. This third coating is applied with a soft brush.

It may sometimes be necessary to apply more than three coatings of my composition to render a fabric water-proof, in which case I do not wish to be understood as confining myself to any given number of coatings; but should such extra coatings be necessary, in all coatings after the first the proportion of turpentine and lamp-black to the gallon of elastic substance (consisting of linseed-oil, litharge, and red lead) will be the same as in the second and third coatings.

After as many coatings of the composition have been applied as are necessary to render the fabric perfectly water-proof there may remain a disagreeable sensation of stickiness, which it would be desirable to remove. In this event I apply with a very soft brush a dressing made of a mixture of shellac and alcohol, (sufficient alcohol being used to dissolve the shellac,) thinned down with equal quantities of turpentine and ammonia until the same is of the consistency of water, and thus cause all stickiness to disappear.

What I claim as new, and desire to secure by Letters Patent, is—

1. A composition for waterproofing fabrics, consisting of linseed-oil, litharge, red lead, turpentine, and lamp-black, prepared in the manner hereinbefore fully set forth.

2. A composition for removing stickiness from materials subjected to several coatings of the above-claimed composition, consisting of shellac, alcohol, turpentine, and ammonia, substantially as specified.

3. The process of waterproofing fabrics, consisting of several applications of a composition made of linseed-oil, litharge, red lead, turpentine, and lamp-black, the thoroughly rubbing of the fabric after each or several applications of the same, and the final application of a composition to remove stickiness, consisting of shellac, alcohol, turpentine, and ammonia, substantially as and for the purpose set forth.

WILLIAM McNEIL.

Witnesses:
HENRY V. FREEMAN,
N. J. MINER.